(12) United States Patent
Gridnev et al.

(10) Patent No.: US 7,022,792 B2
(45) Date of Patent: Apr. 4, 2006

(54) INITIATION OF POLYMERIZATION BY HYDROGEN ATOM DONATION

(75) Inventors: Alexei A. Gridnev, Wilmington, DE (US); Steven Dale Ittel, Wilmington, DE (US)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/802,024

(22) Filed: Mar. 16, 2004

(65) Prior Publication Data
US 2005/0209418 A1  Sep. 22, 2005

(51) Int. Cl.
*C08F 120/06* (2006.01)

(52) U.S. Cl. .......... 526/328; 526/328.5; 526/329.7; 526/319; 526/147; 526/103; 526/161; 526/172; 526/141; 526/219.6

(58) Field of Classification Search ........ 526/328, 526/328.5, 329.7, 319, 147, 103, 161, 172, 526/141, 219.6
See application file for complete search history.

(56) References Cited

U.S. PATENT DOCUMENTS

| | | |
|---|---|---|
| 4,680,352 A | 7/1987 | Janowicz et al. |
| 4,694,054 A | 9/1987 | Janowicz |
| 5,306,856 A | 4/1994 | Streck et al. |
| 5,310,807 A | 5/1994 | Antonelli et al. |
| 5,362,813 A | 11/1994 | Antonelli et al. |
| 5,412,039 A | 5/1995 | Barsotti et al. |
| 5,502,113 A | 3/1996 | Antonelli et al. |
| 5,587,431 A | 12/1996 | Gridnev et al. |
| 5,602,220 A | 2/1997 | Haddleton et al. |
| 5,684,101 A * | 11/1997 | Muir et al. ......... 526/172 |
| 5,726,263 A | 3/1998 | Gridnev |
| 5,770,665 A | 6/1998 | Haddleton et al. |

FOREIGN PATENT DOCUMENTS

| | | | |
|---|---|---|---|
| WO | WO 87/03605 | * | 6/1987 |
| WO | WO 95/25765 | | 9/1995 |
| WO | WO 96/13527 | | 5/1996 |

* cited by examiner

Primary Examiner—Ling-Sui Choi

(57) ABSTRACT

This invention relates to the polymerization of vinylically-unsaturated monomers in the presence of a chain transfer catalysts where the polymerization process is initiated with hydrogen gas or a hydrogen atom donor rather than conventional free radical initiators. This invention further relates to an improved process for the polymerization of vinylically-unsaturated monomers in the presence of a chain transfer catalysts where the polymerization process is initiated with hydrogen gas.

26 Claims, No Drawings

INITIATION OF POLYMERIZATION BY HYDROGEN ATOM DONATION

FIELD OF THE INVENTION

This invention relates to the initiation of polymerization of one or more vinylically-unsaturated monomers using hydrogen atom donors in the presence of chain transfer catalysts. This invention further relates to the improved initiation of polymerization of vinylically-unsaturated monomers using hydrogen gas in the presence of chain transfer catalysts.

TECHNICAL BACKGROUND

It is known to use various cobalt complexes (e.g., cobaloximes or cobalt porphyrins) as chain transfer catalysts (CTC) to provide oligomers or macromonomers bearing terminal double bonds for use in polymeric products. See commonly owned U.S. Pat. Nos. 5,310,807, 5,362,813, 5,412,039, 5,502,113, and 5,587,431 and WO 9525765. All of the polymerizations were initiated with azo initiators commonly employed in the acrylics industry and none of the polymerizations were initiated with hydrogen gas or hydrogen atom donors as described herein.

The use of chain transfer catalysts to control the molecular weight of oligomers and polymers is known. U.S. Pat. Nos. 5,602,220, 5,770,665 and 5,684,101 as well as WO9613527 disclose this control, but do not teach initiation with hydrogen gas or hydrogen atom donors. Commonly owned U.S. Pat. No. 5,726,263, and application Ser. Nos. 08/818,860, 09/193,701 and 08/912,593 also disclose this control, but again, disclose only conventional initiation of polymerization.

The use of chain transfer catalysts in the presence of hydrogen gas to initiate oligomerization and polymerization is disclosed in commonly owned U.S. Pat. No. 4,680,352, but that patent does not teach initiation by hydrogen atom donors. In the disclosure of initiation in the presence of hydrogen gas, the patent cites the use of cobalt complexes with planar macrocyclic rings and particularly bisglyoximato ligands, but does not disclose that certain hydrogen-atom bridged catalysts are far more efficacious than others catalysts.

U.S. Pat. No. 5,306,856 discloses the synthesis of alpha, omega-vinylically-unsaturated oligomers by the high temperature, liquid phase reaction of alpha, omega-diolefin(s) in the presence of aluminium hydrides. The process is not a free radical process, but rather is a coordination polymerization and chain transfer catalysts are not involved.

SUMMARY OF THE INVENTION

This invention relates to a process for polymerizing one or more vinylically-unsaturated monomers to products having controlled molecular weight and end-group functionality, wherein the process comprises contacting said monomers with hydrogen gas or a hydrogen atom donor and a chain transfer catalyst; said process carried out at a temperature from about room temperature to about 240° C., in the absence of a free radical initiator and optionally in the presence of a solvent.

This invention further relates to the products of the processes described and their use in selected applications.

DETAILS OF THE INVENTION

The oligomers, macromonomers and polymers made by the inventive process are typically prepared in a polymerization reaction by standard solution polymerization techniques, but may also be prepared by emulsion, suspension or bulk polymerization processes. A continuous (CSTR) polymerization process may also be used. All ingredients may be present at the beginning of the polymerization or the polymerization may be carried out with continuous addition as in the starved-feed mode.

As used herein, the term polymer refers to a macromolecule consisting of two or more repeat units of the monomer and polymerization is the process whereby that macromolecule is prepared. Polymer is construed to include both homopolymers from polymerization of one type of monomer and copolymers resulting from the polymerization of two or more types of monomers. Oligomer or co-oligomer generally refers to macromolecules having a carbon chain length of between 4 (dimer) and about 50 when the product is to be used in a final end-use application without further polymerization though the vinylically-unsaturated end group. Macromonomer generally refers to a macromolecule having a carbon chain length of between 4(dimer) and about 50 when the product is to by utilized in a subsequent polymerization making use of the single terminal vinylic unsaturation provided by this process and contributes only a single monomeric unit to the subsequent macromolecule. Polymers or copolymers having a carbon chain length greater than about 50 are available from this process. The terms macromonomer and oligomer can used to describe the same material and are often used interchangeably in the trade. When suitably functionalized with pendant reactive groups, both oligomers or macromonomers can be used in many applications where there is subsequent polymerization or crosslinking though those reactive groups; thus in these applications they can be considered to be polyfunctional materials, but not necessarily macromonomers in the sense that they do not contribute a single monomer to a growing polymer chain.

Other than in specific cases where dimer is the only product produced, the product polymer is a distribution of molecular weights as is usually observed in polymer chemistry.

In conventionally-initiated polymerizations, an initiator that produces carbon-centered radicals, sufficiently mild not to destroy the metal chelate chain transfer catalyst, is typically also employed in preparing the polymers. These initiators are typically azo compounds having the requisite solubility and appropriate half life, including azocumene; 2,2'-azobis(2-methyl)-butanenitrile; 2,2'-azobis(isobutyronitrile)(AIBN); 4,4'-azobis(4-cyanovaleric acid); and 2-(t-butylazo)-2-cyanopropane. In the oligomerizations and polymerizations described herein, these conventional initiators are not employed.

Vinylically-unsaturated monomers suitable for use in this process and giving the often-desired terminal vinylic unsaturation (described as Class I) include monomers such as methyl methacrylate, ethyl methacrylate, propyl methacrylates (all isomers), butyl methacrylates (all isomers), 2-ethylhexyl methacrylate, isobornyl methacrylate, methacrylic acid, benzyl methacrylate, phenyl methacrylate, cyclohexyl methacrylate, 2-hydroxyethyl methacrylate, 2-hydroxypropyl methacrylate, 2-isocyanatoethyl methacrylate, methacrylonitrile, alpha-methyl styrene and its phenyl-substituted analogs, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, glycidyl methacrylate. Also suitable are isopropenyl butyrate, isopropenyl acetate, isopropenyl benzoate, isopropenyl chloride, isopropenyl fluoride, isopropenyl bromideitaconic, aciditaconic anhydride, dimethyl itaconate, methyl itaconate, N-tert-butyl methacrylamide, N-n-butyl methacrylamide, N-methylol methacrylamide, N-ethylol methacrylamide, isopropenylbenzoic acids (all isomers), diethylamino α-methylstyrenes (all isomers), methyl-α-methylstyrenes (all isomers), isopropenylbenzene sulfonic acids (all isomers), methyl 2-hydroxymethacrylate, ethyl 2-hydroxymethylacrylate, propyl 2-hydroxymethylacrylates (all isomers), butyl 2-hydroxymethylacrylates (all isomers), 2-ethylhexyl 2-hydroxymethylacrylate, isobornyl 2-hydroxymethylacrylate, methyl 2-chloromethylacrylate, ethyl 2-chloromethylacrylate, propyl 2-chloromethylacrylates (all isomers), butyl 2-chloromethylacrylates (all isomers), 2-ethylhexyl 2-chloromethylacrylate, isobornyl 2-chloromethylacrylate, chloroprene, 2-phenylallylalcohol and substituted 2-phenylallylalcohols, N-isopropenylpyrrolidinone, 3-isopropenyl-αα-dimethyl isocyanate, isopropenylanilines, isopropenyl chloroformate, 2-aminoethyl methacrylate hydrochloride, 2-methacryloxyethyl phosphoryl choline, glycerol monomethyl methacrylate, 3-O-methacryloyl-1,2:5,6-di-O-isopropylidene-D-glucofuranose, α-methylene-γ-butyrolactone and substituted α-methylene-γ-butyrolactones.

Equally effective are di- and polyfunctional vinylically-unsaturated monomers, though they will lead to crosslinking at higher conversions. They give the often-desired terminal vinylic unsaturation and are thus also included in Class I. Such monomers include ethanediol dimethacrylate, 1,2-propanediol dimethacrylate, 1,3-propanediol dimethacrylate, butanediol dimethacrylate (all isomers), hexanediol dimethacrylate (all isomers), neopentylglycol dimethacrylate, cyclohexanediol dimethacrylate (all isomers), cyclohexanedimethanol dimethacrylate (all isomers), diethyleneglycol dimethacrylate, dipentaerythritol monohydroxy pentamethacrylate, alkoxylated bisphenol-A dimethacrylate (al isomers), ethanediol dimethacrylate, ethoxylated trimethylolpropane trimethacrylate, glycerylpropoxy trimethacrylate, pentaerythritol tetramethacrylate, pentaerythritol trimethacrylate, polyethyleneglycol dimethacrylate, diisopropenylbenzenes (all isomers), diisopropenyl adipate, diisopropenyl maleate, and diisopropenyl terephthalate.

Certain additional monomers do not give the often-desired terminal vinylic unsaturation in the final product when used in homopolymerizations, but the initiation processes described herein remain effective. When these monomers are employed in copolymerizations with the above Class I monomers the often-desired terminal vinylic unsaturation is usually obtained. These monomers are described as Class II monomers, and include methyl acrylate, ethyl acrylate, propyl acrylate (all isomers), butyl acrylates (all isomers), 2-ethylhexyl acrylate, isobornyl acrylate, acrylic acid, benzyl acrylate, phenyl acrylate, acrylonitrile, glycidyl acrylate, 2-hydroxyethyl acrylate, hydroxypropyl acrylates (all isomers), hydroxybutyl acrylates (all isomers), diethylaminoethyl acrylate, triethyleneglycol acrylate, N-tert-butyl acrylamide, N-n-butyl acrylamide, N-methyl-ol acrylamide, N-ethyl-ol acrylamide, N, N-dimethylacrylamide, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl propionate, vinyl butyrate, vinyl benzoate, vinyl chloride, vinyl fluoride, vinyl bromide, N-vinylpyrrolidinone, and styrenes. By styrenes is meant unsubstituted styrene and all substituted styrenes where the substitution is on the aromatic ring—for instance, o-, m- and p-diethylaminostyrenes, o-, m- and p-methylstyrenes, o-, m- and p-vinylbenzene sulfonic acids, o-, m- and p-vinylbenzoic acids and their esters, and the many polysubstituted combinations thereof.

In addition to the monofunctional monomers, certain bi- or poly-functional Class II monomers are effective. They include monomers such as ethanediol diacrylate, 1,2-propanediol diacrylate, 1,3-propanediol diacrylate, butanediol diacrylate (all isomers), hexanediol diacrylate (all isomers), neopentylglycol diacrylate, cyclohexanediol diacrylate (all isomers), cyclohexanedimethanol diacrylate (all isomers), diethyleneglycol diacrylate, dipentaerythritol monohydroxy pentaacrylate, alkoxylated bisphenol-A diacrylate (all isomers), ethanediol diacrylate, ethoxylated trimethylolpropane triacrylate, glycerylpropoxy triacrylate, pentaerythritol tetraacrylate, pentaerythritol triacrylate, polyethyleneglycol diacrylate, divinylbenzenes (all isomers), divinyl adipate, divinyl maleate, and divinyl terephthalate, divinyldimethylsilane, divinyldiphenylsilane, divinyldimethoxysilane, 1,3-divinyl-1,3-dimethyl-1,3-dimethoxydisiloxane, 1,3-divinyl-1,1,3,3-tetramethyl-1,3-disiloxane, tetravinylsilane, tetravinyldimethylsilane, diallyldimethylsilane, diallyldiphenylsilane, diallyldimethoxysilane, and o-, m- and p-divinylbenzenes.

Particularly suitable metallic chain transfer catalysts are cobalt (II) and cobalt (III) chelates, also know as cobalt chain transfer catalysts or CCT catalysts. Examples of such cobalt compounds are disclosed in U.S. Pat. No. 4,680,352, U.S. Pat. No. 4,694,054, U.S. Pat. No. 5,324,879, WO87/03605 published Jun. 18, 1987, U.S. Pat. No. 5,362,826, and U.S. Pat. No. 5,264,530. Other useful cobalt compounds (cobalt complexes of porphyrins, phthalocyanines, tetraazoporphyrins, and cobaloximes) are respectively disclosed in Enikolopov, N. S., et al., USSR Patent 664,434 (1978); Golikov, I., et al., USSR Patent 856,096 (1979); Belgovskii, I. M., USSR Patent 871,378 (1979); and Belgovskii, I. M., et al., USSR Patent 1,306,085 (1986). Suitable catalysts are also disclosed in Gridnev and Ittel, Chemical Reviews, 101(12), 3611 (2001).

U.S. Patent Publication 2003149275 by DuPont discloses an improved preparation of certain alkylcobalt(III)dioximate complexes by the reaction of cobalt(II) salts, the dioxime-ligands, an olefin and a Lewis base in the presence of molecular hydrogen. The cobalt complexes disclosed in that application are useful for the polymerization processes described herein and are incorporated by reference.

This process is not limited to the use of cobalt chain transfer catalysts. In addition to the cobalt chain transfer catalysts, catalysts based upon carbonyl chromium cyclopentadienyls (Tang, Papish, Abramo, Norton, Baik, Friesner, and Rappe, Journal of the American Chemical Society (2003),125(33), 10093–10102) and iron diimines (Gibson, O'Reilly, Wass, White, and Williams, Macromolecules (2003), 36(8), 2591–2593) may be employed in this invention.

These cobalt, chromium or iron catalysts operate at close to diffusion-controlled rates and are effective at part-per-million concentrations. Specific examples of these glyoximato-based cobalt (II) and cobalt (III) chain transfer catalysts include, but are not limited to those represented by the following structures:

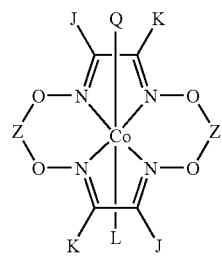

Co(II)(DPG-BF$_2$)$_2$, where J=K=Ph, Q=L=ligand, Z=BF$_2$
Co(II)(DMG-BF$_2$)$_2$, where J=K=Me, Q=L=ligand, Z=BF$_2$
Co(II)(EMG-BF$_2$)$_2$, where J=Me, K=Et, Q=L=ligand, Z=BF$_2$
Co(II)(DEG-BF$_2$)$_2$, where J=K=Et, Q=L=ligand, Z=BF$_2$
Co(II)(CHG-BF$_2$)$_2$, where J=K=—(CH$_2$)$_4$—, Q=L=ligand, Z=BF$_2$
Co(II)(DMG-BF$_2$)$_2$, where J=K=Me, Q=L=ligand, Z=BF$_2$
Co(II)(DPG-H)$_2$, where J=K=Ph, Q=L, L=ligand, Z=H
Co(II)(DMG-H)$_2$, where J=K=Me, Q=L, L=ligand, Z=H
Co(II)(EMG-H)$_2$, where J=Me, K=Et, Q=L, L=ligand, Z=H
Co(II)(DEG-H)$_2$, where J=K=Et, Q=L, L=ligand, Z=H
Co(II)(CHG-H)$_2$, where J=K=—(CH$_2$)$_4$—, Q=L, L=ligand, Z=H
Co(II)(DMG-H)$_2$, where J=K=Me, Q=L, L=ligand, Z=H
QCo(II)(DPG-BF$_2$)$_2$, where J=K=Ph, Q=alkyl, L=ligand, Z=BF$_2$
QCo(III)(DMG-BF$_2$)$_2$, where J=K=Me, Q=alkyl, L=ligand, Z=BF$_2$
QCo(II)(EMG-BF$_2$)$_2$, where J=Me, K=Et, Q=alkyl, L=ligand, Z=BF$_2$
QCo(III)(DEG-BF$_2$)$_2$, where J=K=Et, Q=alkyl, L=ligand, Z=BF$_2$
QCo(III)(CHG-BF$_2$)$_2$, where J=K=—(CH$_2$)$_4$—, Q=alkyl, L=ligand, Z=BF$_2$
QCo(II)(DMG-BF$_2$)$_2$, where J=K=Me, Q=halogen, L=ligand, Z=BF$_2$
QCo(III)(DPG-H)$_2$, where J=K=Ph, Q=alkyl, L=ligand, Z=H
QCo(III)(DMG-H)$_2$, where J=K=Me, Q=alkyl, L=ligand, Z=H
QCo(III)(EMG-H)$_2$, where J=Me, K=Et, Q=alkyl, L=ligand, Z=H
QCo(III)(DEG-H)$_2$, where J=K=Et, Q=alkyl, L=ligand, Z=H
QCo(III)(CHG-H)$_2$, where J=K=—(CH$_2$)$_4$—, Q=alkyl, L=ligand, Z=H
QCo(III)(DMG-H)$_2$, where J=K=Me, Q=halogen, L=ligand, Z=H In the above specific examples, DMG is dimethylglyoxime based upon 2,3-butanedione, DEG is its ethyl analog based upon 3,4-hexanedione, EMG is the ethyl,methyl analog based upon 2,3-pentanedione, CHG is based upon 1,2-cyclohexanedione and DPG or diphenylglyoxime ligands are based upon bibenzoyl.

Axial ligands, L, can be a variety of additional neutral ligands commonly known in coordination chemistry. Examples include water, amines, ammonia, nitrogen heterocycles, and phosphines. In one exemplification of this invention, the axial ligands promote the initiation reaction and are referred to specifically as electron donors. Electron donors include amines; nitrogen heterocycles such as pyridines, imidazole, pyrrole, pyrimidine, benzpyrazole; and phosphorus ligands such as phosphines or phosphites.

Q is an organic radical (e.g., alkyl or substituted alkyl). Especially suitable Q groups are isopropyl, 1-cyanoethyl, and 1-carbomethoxyethyl. When Q is present, the cobalt center is formally Co(III). When Q is a ligand, L, the cobalt center is formally Co(II). When J and K are not the same, it is not intended to designate their relative positions around the coordination plane. The two glyoximato ligands are typically bridged. The most common bridges are a proton and BF$_2$, but may also include a variety of other species including dialkyl or diarylborate, BCl$_2$, and other species that are formally monocationic until ligated into the complex.

The chain transfer catalyst herein designated CoBF$_2$ represents the family of chemicals defined by Z=BF$_2$, or bis-[(1,2-diR*-ethanedioxymato)(2-)O:O'-tetrafluorodiborato(2-)-N'N"N'"N""](Q)(L)cobalt(III), where R* is alkyl, aryl or substituted aryl, Q is an alkyl or substituted alkyl ligand or an acido ligand (e.g., chloro, bromo), and L is a Lewis base such as water, pyridine, imidazole, other nitrogen heterocycles, phosphine, as well as their derivatives. It is preferred that R* is methyl, Q is isopropyl and L is water, which represents one of the catalysts most frequently used in this study. This is referred to as Cat-1, shown below. The other primary catalyst used in this study has a hydrogen atom bridge rather than a BF$_2$ bridge; L is pyridine; Q is methoxyethylpropionate; and R* is methyl. This is referred to as Cat-2, shown below.

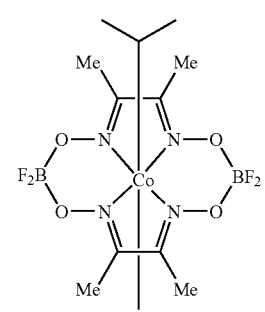

Cat-1

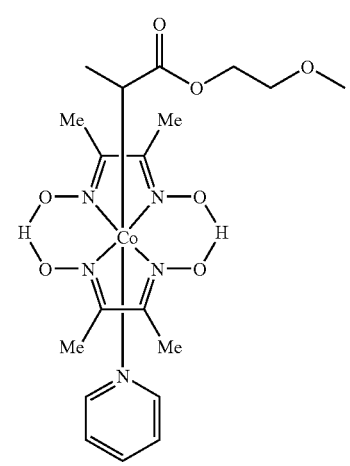

Cat-2

The catalysts can also include cobalt complexes of a variety of porphyrin molecules such as tetraphenylporphyrin, tetraanisylporphyrin, tetramesitylporphyrin and other substituted porphyrin species.

The very specific planer, macrocyclic structures of the cobalt catalysts allows molecular weight (MW) to be effectively controlled. It is also important that these reactions lead to formation of polymers and oligomers with a terminal double bond (strictly one bond per polymer molecule, more than 95%) as found in Davis, Haddleton, and Richards, Rev. Macromol. Chem. Phys., C34 (1994) 243. This allows the products to be used as macromonomers for subsequent copolymerizations. The polymerization process, employing the above described metallic chain transfer catalysts, is carried out suitably at a temperature ranging from about room temperature to about 240° C. or higher, preferably about 50° C. to 150° C. The polymers made by the inventive process are typically prepared in a polymerization reaction by standard solution polymerization techniques, but may also be prepared by emulsion, suspension or bulk polymerization processes. The polymerization process can be carried out as either a batch, a semi-batch, or a continuous (CSTR) process. When carried out as a batch process, the reactor is typically charged with metal chain transfer catalyst, a monomer, optionally with a solvent. Normally at this point, the desired amount of initiator is added to the mixture, typically such that the monomer-to-initiator ratio is 5 to 1000. However, in the current invention, no initiator is added. Rather, the mixture is exposed to hydrogen gas or a hydrogen atom donor molecule. The mixture is then heated for the requisite time, usually from about 30 minutes to about 12 hours. In a batch semibatch or continuous process, the reaction may be run under pressure to avoid monomer reflux.

A hydrogen atom donor molecule, D-H, is a molecule capable of readily donating a hydrogen atom to the metal center of the chain transfer catalyst. In the present invention it is preferred that D-H represents a hydrogen donor wherein the corresponding organic radical D. has a stability which is at least several hundred times greater than that of a primary alkyl radical (e.g., ethyl radical) and less than 6000 times that of a primary alkyl radical. The method of determining this stability (or reactivity) is well known in the art (Radicals Vol. 1, Jay K. Kochi, John Wiley and Sons, 1973, N.Y., N.Y., pp.302–03). The stability measured is the stability of the radical D. (i.e., the radical resulting from removal of H. from D-H) as compared to the stability or reactivity of a primary alkyl radical.

Hydrogen atom donor compounds include such diverse chemical classes of materials as stananes, silanes, benzhydrols, diarylphosphines, triarylmethanes, N,ω-dialkylpiperizines, 3-pyrrolines, xanthenes, 9,10-dihydroanthracenes, 9-hydroxyfluorenes, aryl-β-ketoesters, aldehydes, benzylic alcohols, alkyl-β-ketoesters, oximes (such as acetophenone oxime and benzaldehyde oxime), and amidoximes (such as caprolactam oxime). Specific examples of hydrogen atom donors include but are not limited to the following reagents: tributyltin hydride, triethylsilane, benzhydrol, triphenylmethane, N,N'-dimethylpiperazine, xanthene, 9,10-dihydroanthracene, 1,2-dihydronaphthalene, 9-hydroxyfluorene, pivaldehyde, ethyl benzoylacetate, or ethyl isobuterylacetate. Molecules such as 3-pyrroline or diphenylphosphine can serve as hydrogen atom donors, but the ability of the nitrogen or phosphorus atom to coordinate to the cobalt or other metal center must be taken into consideration.

As indicated above, the polymerization can be carried out in the absence of, or in the presence of, any medium or solvent suitable for free-radical polymerization, including, but not limited to, ketones such as acetone, butanone, pentanone and hexanone; alcohols such as isopropanol; amides such as dimethyl formamide; aromatic hydrocarbons such as toluene and xylene; ethers such as tetrahydrofuran and diethyl ether; ethylene glycol; glycol ethers, alkyl esters or mixed ester ethers such as monoalkyl ether-monoalkanoates; and mixtures of two or more solvents.

U.S. Pat. No. 5,726,263 to DuPont describes a method by which macromonomers formed by chain transfer catalysis polymerization methods may be decolorized by selective extraction and/or adsorption. The process involves a process of selection of polarities of the monomers, solvent and catalyst to optimize the catalyst residue removal process. The dimers, trimers and oligomers formed during the polymerization reaction have a very low optical density. U.S. Pat. No. 5,750,772 to DuPont describes a process whereby hydroxy-containing methacrylate homo- and copolymers are decolorized by the addition of a strong acid and a chelating, bidentate nitrogen ligand with subsequent purification through a polar adsorption medium. In the processes described herein, it is often desirable to utilize relatively high concentrations of chain transfer catalyst, so the product decolorization processes described above could be of particular importance.

The oligomers, polymers and/or copolymers prepared according to the present invention can be employed, not only as non-metallic chain transfer agents, but as useful components and intermediates in the production of graft copolymers, non-aqueous dispersed polymers, block copolymers, microgels, star polymers, branched polymers, structured polymers and ladder polymers.

The products of the processes described herein find use in the production of architectural coatings; automotive finishes, including high solids, aqueous and solvent-based finishes; high-build maintenance finishes and other paints; printing inks including ink jet inks and UV/EB curable inks; multilayer coatings; varnishes; crosslinking agents; defoamers; deaeraters; wetting agents; substrate wetting additives; surface control additives; reactive surface control additives; hydrophobing agents; antigraffiti agents; nucleating agents; personal care products; masks for screen printing; dental filling materials; adhesives; lubricants; oil drilling fluids; adhesion promoters; coupling agents; dispersants (e.g., for pigments); grinding agents; solder masks; tackifiers; leveling agents; artificial stone and marble; impact modifiers; compatibilizers; plasticizers; caulks; sealants; drug delivery agents; electronic materials; processing aids; antistatics; softeners; antioxidants; UV stabilizers; dispersion media; release agents; ion exchange resins or membranes; molded objects; extruded objects; chain transfer reagents; photopolymerizable materials; and etch or permanent resists for printed electronic circuits. When hydroxyl-functionalized, they may be employed in rigid polyurethanes, polyurethane foams, polyurethane adhesives and polyurethane finishes.

EXAMPLES $^1$H-NMR spectra were taken on a QE300 NMR spectrometer (General Electric Co., Freemont, Calif. 94539) at 300 MHz frequency.

$K^+$ IDS mass spectroscopy is an ionization method that produces pseudomolecular ions in the form of $[M]K^+$ with little or no fragmentation. Intact organic molecules are desorbed by rapid heating. In the gas phase the organic molecules are ionized by potassium attachment. Potassium ions are generated from an aluminosilicate matrix that contains $K_2O$. All of these experiments were performed on a Finnegan Model 4615 GC/MS quadrupole mass spectrometer (Finnegan MAT (USA), San Jose, Calif.). An electron impact source configuration operating at 200° C. and a source pressure of <1×10$^{-6}$ torr was used.

Matrix-Assisted Laser Desorption/Ionization (MALDI) mass spectra were obtained on an Applied Biosystems Voyager DE-STR MALDI mass spectrometer. Samples were prepared by co-crystallizing the analyte solution with a UV-absorbing matrix (2,5-dihydroxybenzoic acid) onto a stainless steel target plate which was introduced to the mass spectrometer under high vacuum (about 2e–7 torr). Irradiation with a nitrogen laser at 337 nm was used to transfer the analyte to the gas phase, where Na$^+$ or K$^+$ cations ionized the molecules. A voltage of 20 kV was applied to accelerate the ions to determine their mass by time of flight.

The size exclusion chromatography method used to measure the molecular weight distribution in these systems utilized an Alliance 2690 from Waters Corporation (Milford, Mass.), with a Waters 410 refractive index detector (DRI). The software for data reduction was Trisec® Conventional GPC version 3.0 by Viscotek. The columns were two PL Gel Mixed C and one PL Gel 500A columns from Polymer Laboratories. The mobile phase was unstabilized THF. Chromatographic conditions were 35° C. at a flow rate of 1.00 ml/min, an injection volume of 100 µl and a run time of 50 min. Samples were dissolved for 4 hours in the mobile phase solvent at RT with moderate agitation. Standards for column calibration were a set of 10 narrow polydispersity (<1.1) poly(methyl methacrylate) (PMMA) standards with peak molecular weights from 1680 through 1,399,000 available from Polymer Laboratories. The column calibration method with PMMA narrow standards utilized a third order of polynomial fit.

All chemicals and reagents in the examples below were used as received from Aldrich Chemical Co., Milwaukee, Wis. unless otherwise indicated.

Examples

Example 1

Oligomerization of Butyl Methacrylate with Hydrogen Initiation

Reagent grade butyl methacrylate (19.5 mL), 60 mg of pyridinato-bis(dimethylglyoximato)-Co(III)-(2-(butyl propionyl) and 10 ml of 1,2-dichloroethane were degassed by passing a stream of nitrogen through the solution. Then the nitrogen was replaced with one atmosphere (101 kPa) of molecular hydrogen and the temperature was raised to 80° C. with continuous stirring of the reaction mixture. After 14 hours the reaction mixture was evaporated and analyzed by GPC and NMR. The yield was 18 mL of a mixture of butyl methacrylate dimer and trimer, indicating successful oligomerization.

Comparative Example A

Control Experiment with No Hydrogen

The experiment was conducted as described in Example 1, except the nitrogen flush was continued throughout the duration of the polymerization and no hydrogen was admitted to the system. After evaporation of the reaction solution less than 1% of polymeric product was obtained. The oligomerization did not occur in the absence of hydrogen.

Comparative Example B

Control Experiment with No Cobalt Chelate

The experiment was conducted as described in Example 1, except the cobalt chelate (pyridinato-bis(dimethylglyoximato)-Co(III)-(2-(butyl propionyl)) was not added. After evaporation of the reaction solution, less than 0.2% of polymeric product was obtained. The oligomerization did not occur in the absence of chain transfer catalyst.

Example 2

Oligomerization of Alpha-Methylstyrene with Hydrogen Initiation

Reagent grade alpha-methyl styrene (30 mL), 8 mg of pyridinato-bis(dimethylglyoximato)-Co(III)-(2-(butyl propionyl) and 5 ml of 1,2-dichloroethane were degassed by passing a stream of nitrogen through the solution. Then nitrogen was replaced with one atmosphere (101 kPa) of molecular hydrogen and the temperature was raised to 90° C. with continuous stirring of the reaction mixture. After 8 hours the resulting product was evaporated and analyzed by GPC and NMR. Approximately 28% of the starting material had been converted to alpha-methyl styrene dimer. Thus, the process is not limited to acrylates.

Example 3

Oligomerization of MMA with Hydrogen Initiation

A solution of (methoxyethylpropionyl)bis(dimethylglyoxime)cobalt(III)- (150 mg Cat-2) in 250 ml MMA was deoxygenated for 20 min by passing molecular hydrogen gas through it. The temperature was then raised to 85° C. The conversions to oligomers are shown in the Table.

Example 4

Oligomerization of MMA with Hydrogen Initiation

A solution of (2-propyl)bis(dimethylglyoximedifluoroborato)cobalt(III)- (150 mg) in 250 ml MMA was deoxygenated for 20 min by passing molecular hydrogen through it. The temperature was then raised to 85° C. The conversions to oligomers are shown in the Table.

Example 5

Improvement with Addition of Imidazole

Example 3 was repeated with the addition of 3 mL of a solution of 0.25% imidazole (Im) in MEK. The conversions to oligomers are shown in the Table. Addition of a small portion of imidazole dramatically increased the conversion.

Example 6

Further Addition of Imidazole

Example 3 was repeated with 3 ml solution of 0.5% imidazole (Im) in MEK. The conversions to oligomers are shown in the Table. Further addition of imidazole continued to increase the conversion.

TABLE

| | Example Number | | | |
|---|---|---|---|---|
| | 3 | 4 | 5 | 6 |
| | Catalyst | | | |
| Time (hr) | Cat-2 | Cat-1 | Cat-1/Im | Cat-1/Im |
| | Yield (%) | | | |
| 0.5 | 88 | 45 | | |
| 0.75 | | | 65 | 75 |
| 2 | 97 | 53 | 77 | 87 |
| 4 | 98 | 60 | | |
| 5 | | | 85 | 92 |
| 6 | 99 | | | |

As can be seen in the Table above, a catalyst with a hydrogen atom bridge (Cat-2) is more effective than a catalyst with a $BF_2$ bridge (Cat-1). Nonetheless, addition of bases such as imidazole have the ability to increase the effectiveness of the $BF_2$-bridged catalysts.

Example 7

Oligomerization with Less Catalyst

Example 1 was repeated utilizing less catalyst. Conversions as a function of time were lower, and the molecular weights of the macronomomers isolated were higher. Thus, the reaction can be carried out with less chain transfer catalyst and the molecular weight of the product increases as expected.

Example 8

Oligomerization of Methyl Methacrylate with Hydrogen Gas Initiation and Demonstration of Terminal Unsaturation Alumina purified methyl methacrylate (13.2 mL, 0.12 mol), cobalt(II)[bis[m-[(2,3-butanedione dioximato)(2-)-O:O']]tetrafluorodiborato(2-)-N,N',N'',N''']isopropyl aquo complex, 60 mg, 0.13 mmol) and methyl ethyl ketone (10 mL) were degassed via bubbling hydrogen gas through the brown solution for 20 min. The solution was heated to 80° C. under minimal hydrogen pressure while stirring for ca. 4 h. The cooled solution was concentrated under reduced pressure leaving a suspension (3.81 g, 31% conversion). ESI and MALDI ($Na^+$ cationization) data show vinylically-unsaturated MMA dimer up to the 12-mer, but centered around trimer. In the low molecular weight GPC analysis, peaks for dimer, trimer and tetramer were clearly visible with a slight shoulder for pentamer.

Example 9

Oligomerization of Methyl Methacrylate Initiating with 1,2-dihydronaphthalene Alumina purified methyl methacrylate (13.2 mL, 0.12 mol), cobalt(II)[bis[m-[(2,3-butanedione dioximato)(2-)-O:O']]tetrafluorodiborato(2-)-N,N',N'',N''']isopropyl aquo complex, 60 mg, 0.13 mmol), 1,2-dihydronaphthalene (0.5 mL, 3.8 mmol), and methyl ethyl ketone (10 mL) were degassed via bubbling nitrogen gas through the brown solution for 20 min. The solution was heated to 80° C. under minimal nitrogen pressure while stirring for ca. 4 h. The cooled solution was concentrated under reduced pressure leaving a fine suspension (1.56 g, 13% conversion). ESI and MALDI ($Na^+$ cationization) data show vinylically-unsaturated MMA dimer up to 19-mer but primarily dimer and trimer. In the low molecular weight GPC analysis, peaks for dimer, trimer, tetramer and pentamer were clearly visible with a slight shoulder for hexamer.

Example 10

Oligomerization of Methyl Methacrylate Initiating with Triethylsilane

Alumina purified methyl methacrylate (13.2 mL, 0.12 mol),cobalt(II)[bis[m-[(2,3-butanedione dioximato)(2-)-O:O']]tetrafluorodiborato(2-)-N,N',N'',N''']isopropyl aquo complex, 60 mg, 0.13 mmol), triethylsilane (0.5 mL, 3.1 mmol), and methyl ethyl ketone (10 mL) were degassed via bubbling nitrogen gas through the solution for 20 min. The solution was heated to 80 ° C. under minimal nitrogen pressure while stirring for ca. 4 h. The cooled solution was concentrated under reduced pressure leaving a fine suspension (2.4 g, 19% conversion). MALDI ($Na^+$ cationization) data show vinylically-unsaturated MMA oligomers up to 20-mer with the low oligomers dominating. The spectra are complicated by the presence of peaks associated with the tin compounds, but there appears to be no incorporation of tin into the oligomers.

Example 11

Oligomerization of Methyl Methacrylate Initiating with Tributyltin Hydride

Alumina purified methyl methacrylate (13.2 mL, 0.12 mol), cobalt(II)[bis[m-[(2,3-butanedione dioximato)(2-)-O:O']]tetrafluorodiborato(2-)-N,N',N'',N''']isopropyl aquo complex, 60 mg, 0.13 mmol), tributyltin hydride (0.25 mL, 0.93 mmol), and methyl ethyl ketone (10 mL) were degassed via bubbling nitrogen gas through the solution for 20 min. The solution was heated to 80 ° C. under minimal nitrogen pressure while stirring for ca. 4 h. The cooled solution was concentrated under reduced pressure leaving a suspension (950 mg, 8% conversion). ESI and MALDI ($Na^+$ cationization) data show vinylically-unsaturated MMA dimer up to pentamer.

Example 12

Co-Oligomerization of Methyl Methacrylate and Butyl Acrylate using Hydrogen Gas Initiation Alumina purified methyl methacrylate (13.2 mL, 0.12 mol), alumina purified butyl acrylate (11.2 mL, 0.078 mol), cobalt(III)[bis[m-[(2,3-butanedione dioximato)(2-)-O:O']] tetrafluorodiborato(2-)-N,N',N'',N''']isopropyl aquo complex, 60 mg, 0.13 mmol) and methyl ethyl ketone (10 mL) were degassed via bubbling hydrogen gas through the solution for 20 min. The solution was heated to 80° C. under minimal hydrogen pressure while stirring for ca. 4 h. The cooled solution was concentrated under reduced pressure leaving a suspension (4.98 g, 25% conversion). MALDI ($Na^+$ cationization) data show vinylically-unsaturated random oligomers of methyl methacrylate with butyl acrylate up to MW 2063 corresponding to 15 MMA: 5 BA. There were undoubtedly higher products not detected by this analytical method. The oligomers were generally of the formula $MMA_{(1-15)}BA_{(0-5)}$. Peaks that could be associated with pure BA oligomers were observed, but at very low intensities. Thus the product in the mixture generally had at least one MMA, presumably as the terminally unsaturated component.

Example 13

Oligomerization of Butyl Acrylate Using Hydrogen Gas Initiation

Alumina purified butyl acrylate (11.2 mL, 0.078 mol), cobalt(II)[bis[m-[(2,3-butanedione dioximato)(2-)-O:O']] tetrafluoro-diborato(2-)-N, N',N",N'"]-isopropyl aquo complex, 60 mg, 0.13 mmol and methyl ethyl ketone (10 mL) were degassed via bubbling hydrogen gas through the solution for 20 min. The solution was heated to 80 ° C. under minimal hydrogen pressure while stirring for ca. 4 h. The cooled solution was concentrated under reduced pressure leaving a viscous liquid (4.5 g, 45% conversion). MALDI (Na$^+$ cationization) data suggest unsaturated BA oligomers and polymer up to 42-mer. Chain transfer for the acrylate was not as efficient as in the presence of some methacrylate, but hydrogen gas initiation was successful.

Example 14

Oligomerization of Methyl Methacrylate Initiated with Hydroquinone

Alumina purified methyl methacrylate (13.2 mL, 0.12 mol), CCT catalyst(cobalt(II)[bis[m-[(2,3-butanedione dioximato)(2-)-O:O']](2-)-N,N',N",N'"]pyridyl(methoxy ethyl propionyl), 60 mg, 0.13 mmol), hydroquinone (440 mg, 4.0 mmol) and methyl ethyl ketone (10 mL) were degassed via bubbling nitrogen gas through the orange solution for 20 min. The solution was heated to 80° C. under minimal nitrogen pressure while stirring for ca. 4 h. The cooled solution was concentrated under reduced pressure giving 2.04 g of oligomer or 17% conversion). MALDI (Na$^+$ cationization) data suggest vinylically-unsaturated MMA trimer up to 45-mer.

Hydroquinone and its closely related product, the monomethylether of hydroquinone (MEHQ), are often added to methyl methacrylate as stabilizers against polymerization during handling and storage. See, for example, an Aldrich catalog. However, the present work example shows the successful use of these materials as polymerization initiators.

Example 15

Oligomerization of Methyl Methacrylate Initiated with Benzhydrol

Alumina purified methyl methacrylate (13.2 mL, 0.12 mol), cobalt(II)[bis[m-[(2,3-butanedione dioximato)(2-)-O:O']](2-)-N,N',N",N'"]pyridyl(methoxy ethyl propionyl), 60 mg, 0.13 mmol), benzhydrol (737 mg, 4.0 mmol) and methyl ethyl ketone (10 mL) were degassed by bubbling argon gas through the orange solution for 20 min. The solution was heated to 80° C. under minimal nitrogen pressure while stirring for ca. 4 h. The cooled solution was concentrated under reduced pressure giving 2.2 g of product or 18% conversion.

Comparative Example C

Azo-derived Impurities in Polymerizations Initiated with Conventional Azo Initiators Alumina purified methyl methacrylate (12 g), CCT catalyst((methoxyethyl propionyl)cobalt(III)[bis[(2,3-butanedione dioximate)(2-)-O:O']] (60 mg), and azobis(isobutyronitrile), 600 mg) were heated at 80° C. in MEK solvent (10 mL) for 4 h. By nmr analysis, the resulting product was primarily the unsaturated dimer of MMA with the next most abundant species being the unsaturated MMA trimer. In the CN region, there was an impurity peak associated with the symmetric vazo dimer that is known to be toxic. In addition, there were many additional small peaks associated with other cyanide-substituted, quaternary carbons atoms. Several of the peak positions were very similar to those of methacrylonitrile and isobutyronitrile. Finally, there were additional peaks of nitrile-containing components that could possibly be associated the incorporation of methacrylonitrile into the oligomers. All of these nitrile-containing products can be associated with the use of an azo initiator, its initial cyanopropyl radical and the products from the cyanopropyl radical after reacting with the cobalt chain transfer catalyst. The use of hydrogen gas or hydrogen atom donors as initiators yields nitrile-free products.

What is claimed is:

1. A process for polymerizing one or more vinylically-unsaturated monomers to form a polymeric product, comprising:
    contacting said vinylically-unsaturated monomers with a chain transfer catalyst and a hydrogen atom donor molecule in the absence of conventional free radical ihitiators, at a temperature from about room temperature to about 240° C., wherein said hydrogen atom donor is selected from dihydronaphthalene, silicon hydrides, tin hydrides, organometallic hydrides, benzylic alcohols, hydroquinones, alkyl ether hydroquinones, and benzhydrol.

2. A process for polymerizing one or more vinylically-unsaturated monomers by contacting said vinylically-unsaturated monomers with a chain transfer catalyst and hydrogen gas in the absence of conventional free radical initiators, said process carried out at a temperature from about room temperature to about 240° C.

3. The process of claim 1 or 2, wherein said temperature is from about 50° C. to 150° C.

4. The process of claim 1 or 2 wherein said chain transfer catalyst is selected from the group consisting of cobalt(II) and cobalt(III) chelates and a mixture thereof.

5. The process of claim 1 or 2, wherein said process is a batch process.

6. The process of claim 1 or 2, wherein said process is a semi-batch or starved feed process.

7. The process of claim 1 or 2, wherein said process is a continuous process.

8. The process of claim 1, wherein said hydrogen atom donor is dihydronaphthalene, triethylsilane, tributyltin hydride, hydroquinone, methyl ether hydroquinone, tetraethylcyclotetrasiloxane, methyidimethoxysilane, tetramethyidisiloxane, trimethylsilane, or benzhydrol.

9. The process of claim 1 or 2, wherein the process is conducted in the presence of a solvent selected from the group consisting of ketones; alcohols; amides; aromatic hydrocarbons; ethylene glycol; glycol ethers, alkyl esters, mixed ester ethers; and mixtures thereof.

10. The process of claim 1 or 2, wherein at least one monomer is a methacrylate monomer.

11. The process of claim 1 or 2, wherein at least one monomer is an acrylate or a styrene monomer.

12. The process of claim 1 or 2, wherein at least one monomer is a methacrylate monomer, at least one monomer is an acrylate monomer or a styrene monomer.

13. The process of claim 10 wherein said resulting product is terminally unsaturated.

14. The process of claim 12, wherein said resulting product is terminally unsaturated.

15. The process of claim 1 or 2, wherein said hydrogen pressure is from 0.01 to 100 atmospheres.

16. The process of claim 1 or 2, wherein said hydrogen pressure is from 1 to 10 atmospheres.

17. The process of claim 1 or 2, wherein said process is carried out in the presence of a solvent.

18. The process of claim 9, wherein said ketone is selected from acetone, butanone, pentanone and hexanone.

19. The process of claim 9, wherein said alcohol is isopropanol.

20. The process of claim 9, wherein said amide is dimethyl formamide.

21. The process of claim 9, wherein said aromatic hydrocarbon is selected from toluene and xylene.

22. The process of claim 9, wherein said ether is selected from tetrahydrofuran and diethyl ether.

23. The process of claim 9, wherein said mixed ester ether is a monoalkyl ether monoalkanoate.

24. The process of claim 1 or 2, wherein said catalyst is a glyoximato-based cobalt chain transfer catalyst.

25. The process of claim 1 or 2, wherein said catalyst is selected from hydrogen bridged bisglyoximato ligands.

26. The process of claim 1 or 2, wherein said process is carried out in the presence of an electron donor.

\* \* \* \* \*